United States Patent
Itoi et al.

[11] Patent Number: 6,159,437
[45] Date of Patent: Dec. 12, 2000

[54] METHOD FOR MANUFACTURING AN APTATITE SLURRY

[75] Inventors: Masatoshi Itoi; Michiro Kuwayama; Seikichi Tabei, all of Tokyo, Japan

[73] Assignee: Nippon Chemical Industrial Co., Ltd., Tokyo, Japan

[21] Appl. No.: 09/319,382

[22] PCT Filed: Oct. 8, 1997

[86] PCT No.: PCT/JP97/03619

§ 371 Date: Jun. 4, 1999

§ 102(e) Date: Jun. 4, 1999

[87] PCT Pub. No.: WO99/18029

PCT Pub. Date: Apr. 15, 1999

[30] Foreign Application Priority Data

May 8, 1996 [JP] Japan .................................... 8-137413

[51] Int. Cl.[7] .................................................. C01B 15/16
[52] U.S. Cl. ............................................ 423/308; 423/311
[58] Field of Search ...................................... 423/305, 308, 423/311; 516/33

[56] References Cited

U.S. PATENT DOCUMENTS

| | | | |
|---|---|---|---|
| 4,689,351 | 8/1987 | Endo et al. | 521/60 |
| 4,897,250 | 1/1990 | Sumita | 423/308 |
| 5,427,754 | 6/1995 | Nagata et al. | 423/608 |

FOREIGN PATENT DOCUMENTS

| | | |
|---|---|---|
| 0174827 | 3/1986 | European Pat. Off. . |
| 19546757 | 6/1996 | Germany . |
| 62-265108 | 11/1987 | Japan . |
| 1-230413 | 9/1989 | Japan . |
| 2-149408 | 6/1990 | Japan . |
| 3-083805 | 4/1991 | Japan . |
| 4-175213 | 6/1992 | Japan . |
| 93/04013 | 3/1993 | WIPO . |

OTHER PUBLICATIONS

Database WPI Section Ch, Week 9524 Derwent Publications Ltd., London, GB; Class A18, AN 95–182991, XP002115888 & JP 07 102006 A (Nippon Chem Ind Co Ltd), Apr. 18, 1995 *abstract*.

Patent Abstracts of Japan vol. 015, No. 256 (C–0845), Jun. 28, 1991 & JP 03 083805 A (Sumintomo Chem Co Ltd), Apr. 9, 1991 *abstract*.

Database WPI Section Ch, Week 9732 Derwent Publications Ltd., London, GB; Class A60, AN 97–347173 XP002115889 & JP 09 142817 A (Calseed KK), Jun. 3, 1997 *abstract*.

Chemical Abstracts, vol. 90, No. 10, Mar. 5, 1979 Columbus, Ohio, US; abstract no. 72648, Kido Kunizo Et Al: "Suspension polymerization of acrylonitrile and styrene" XP002115887 *abstract* and JP 53 126094 A (Kureha Chemical Industry Co., Ltd) Nov. 2, 1978.

Hawley's, Condensed Chemical Dictionary 13th Edition. 1997, pp. 385, 543, and 545.

Primary Examiner—Tom Dunn
Assistant Examiner—Maribel Medina
Attorney, Agent, or Firm—Wenderoth, Lind & Ponack, L.L.P.

[57] ABSTRACT

The present invention provides an apatite slurry in which secondary apatite particles are practically completely redispersed, and provides a method of manufacture therefor. The apatite slurry according to the present invention is characterized in that it comprises apatite particles which are dispersed in a water-compatible organic solvent and has a degree of dispersion such that the average particle size of the apatite particles is 1 μm or less and particles of 3 μm or more are practically absent. The method for manufacturing an apatite slurry according to the present invention is characterized in that an apatite slurry in which apatite particles are dispersed in a water-compatible organic solvent is fed to an agitation mill and reduced and dispersed until the degree of dispersion is such that particles of 3 μm or more are practically absent.

4 Claims, 4 Drawing Sheets

METHOD FOR MANUFACTURING AN APTATITE SLURRY

BACKGROUND OF THE INVENTION

1. Field of the Invention

The present invention relates to apatite slurry and a method of manufacture therefor. In particular relates to an apatite slurry which comprises apatite particles which are dispersed in a water-compatible organic solvent and which has a degree of dispersion such that the average particle size of the apatite particles is 1 μm or less and particles of 3 μm or more are practically absent, and a method of manufacture therefor.

2. Description of the Prior Art

Apatites are well-known substances which are widely distributed in the form of phosphate ores, animal bones, etc., but recently the use of apatites has broadened to include materials for artificial bones, materials for dental repair, ion exchangers, etc. Their affinity with living tissue coupled with their environmentally friendly properties promises that they will make their way into yet other fields.

However, in apatites such as hydroxyapatite, even though the primary particles formed during manufacture ire fine particles of 1 μm or less, they tend to aggregate due to Van der Waals forces, ionic charge, etc., and form aggregates of 1 μm or more, especially around 10 to 100 μm.

Consequently, they suffer from the problem that they cannot be used in areas requiring apatites with submicron particle sizes such as anti-blocking agents for films, etc., cosmetics, or UV blocking agents, for example, and their use cannot yet be extended to these areas.

Now, various methods have conventionally been tried which aim to overcome these problems. For example, there is a method (Japanese Patent Laid-Open No. 4-317404) in which the surface of the apatite is reformed and dried after completion of the reaction by adding a fatty acid such as stearic acid. Use of aqueous hydroxyapatite slurry as a stabilizer for suspension polymerization is also well known, and such methods as ultrasonic treatment (Japanese Patent Publication No. 47-38631) and intensive shearing treatment with homogenizers, etc., (Japanese Patents Laid-Open Nos. 7-102005 and 7-102006) have been proposed to disperse the apatite slurry.

OBJECT OF THE INVENTION

However, in the above methods, where the stabilizer for suspension polymerization is adjusted by intensive shearing treatment with homogenizers, etc., using water as a dispersion medium, it is extremely difficult to reduce the aggregated coarse particles even if the treatment is performed for a long time, and so the particles cannot all be reduced to 3 μm or less and particles of 4 μm or more remain. That is, even if the aqueous apatite slurry is treated as much as possible to disperse it, reduction equilibrium is reached and there is a limit to the reduction of secondary particles in the aqueous system.

Consequently, an objective of the present invention is to provide an apatite slurry in which secondary apatite particles can be practically completely redispersed, and to provide a method of manufacture therefor.

MEANS OF SOLVING THE PROBLEMS

The present inventors have considered the above problems and, as a result of extensive diligent research, have discovered that secondary particles can be reduced extremely effectively and be practically redispersed by reducing the apatite particles in a water-compatible organic solvent by means of an agitation mill, and have achieved the present invention.

That is, the apatite slurry according to the present invention is characterized in that it is an apatite slurry in which the apatite particles are dispersed in a water-compatible organic solvent and which has a degree of dispersion such that the average particle size of the apatite particles is 1 μm or less and particles of 3 μm or more are practically absent.

Also, the method of manufacture for apatite slurry according to the present invention is characterized in that an apatite slurry, in which the apatite particles are dispersed in a water-compatible organic solvent is fed to an agitation mill and reduction and dispersion treatment is performed until particles of 3 μm or more are practically absent.

DETAILED DESCRIPTION OF THE INVENTION

Figure 1:
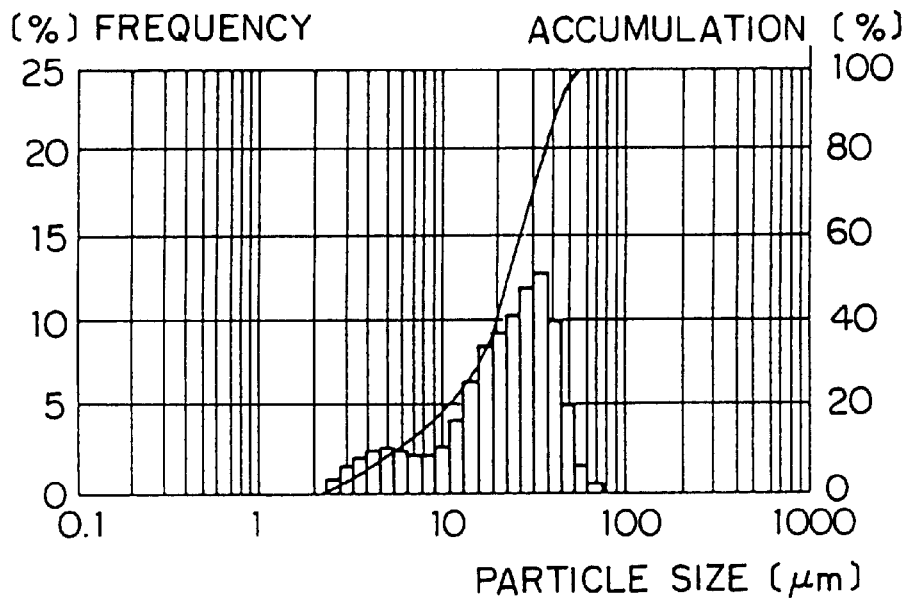
FIG. 1 shows the particle size distribution of the apatite powder used in the examples.

The present invention will now be explained in further detail.

The apatite particles used in the apatite slurry of the present invention are hydroxyapatites and/or hydroxyapatite derivatives, but there are no particular limitations on the production history thereof and products obtained by any method may be used. The following methods are given as examples of possible methods of production for hydroxyapatites:

(1) double decomposition reaction methods in which water-soluble calcium salts and phosphates are reacted in aqueous solution;
(2) solid-liquid reaction methods in which slaked lime and phosphoric acid or phosphates are reacted; or (3) synthesis methods in which calcium hydrogenphosphate and slaked lime are hydrolyzed and reacted.

Because hydroxyapatites are zwitterions, the hydroxyapatite derivatives are also products in which cations or anions have been partially exchanged or reacted with $Ca^{2+}$ or $OH^-$. Examples of such products include: fluoroapatites, in which fluorine atoms have been substituted for hydroxyl groups; chloroapatites, in which chlorine atoms have been substituted; or carbonated apatites; barium apatites, strontium apatites, or magnesium apatites, in which other alkaline earth metal elements have been substituted for calcium; copper-substituted apatites, zinc-substituted apatites, or lead-substituted apatites, in which calcium ions have been partially exchanged with divalent metal ions; and others, including silver-substituted apatites, cesium-substituted apatite, etc. Any of these can be obtained by treating hydroxyapatites with appropriate metallic salt solutions or prescribed anionizing agents which exchange ions in aqueous solution.

The apatite particles used in the apatite slurry of the present invention are not limited to any particular shape and are aggregates having primary particles which are shaped like needles, columns, rice grains, or ovals, for example, but the size of the primary particles is generally divided into two categories: apatite crystal particles with a short-axis length of 10 to 100 nm and a long-axis length of 30 to 300 nm obtained by reaction at a temperature between room temperature and 100° C.; and apatite crystal particles with a short-axis length of 30 to 300 nm and a long-axis length of 100 to 1000 nm obtained by further heating the above apatite crystal particles to a temperature between 500 and 1250° C. to encourage particle growth. Generally, apatite particles are formed by aggregation of such primary particles to a size of about 10 to 100 μm.

The solvent which disperses the particles mentioned above is a water-compatible organic solvent and in most cases it will be an alcohol compound, preferably a diol compound. Representative examples of diol compounds include triethylene glycol, diethylene glycol, ethylene glycol, dipropylene glycol, propylene glycol, and butane diol, but other possible examples of alcohols are methanol, ethanol, propanol, or trihydric alcohol such as glycerine. Furthermore, water or any desired dispersion agent may be directly mixed in, if required.

However, at most 50 percent by weight of water may be added to the organic solvent, and if the amount of water added exceeds 50 percent by weight, the apatite particles cannot be reduced sufficiently and the apatite slurry of the present invention cannot be obtained.

Polymeric phosphate dispersion agents such as sodium hexametaphosphate, sodium tripolyphosphate, etc., may be added to the organic solvent. Furthermore, the addition of dispersion agents is not limited to any particular amount and dispersion agents may be used within the range normally added.

The apatite slurry of the present invention comprises apatite particles dispersed in a water-compatible organic solvent as described above, but is characterized in that it has a degree of dispersion such that the average particle size of the apatite particles is 1 μm or less and apatite particles of 3 μm or more are practically absent.

That is, the apatite slurry according to the present invention differs from the conventional aqueous slurry and is significantly characterized in that, by using an organic solvent like that mentioned above, secondary particles which are composed of coarse particles of 3 μm or more have been completely removed, and the average particle size of the apatite particles is 1 μm or less, which is as close as possible to the primary particles. Furthermore, the degree of dispersion described in the present specification is measured by the method described below.

The amount of apatite particles in the organic solvent, which is the dispersion medium, in other words, the density of solids in the slurry, differs according to the use for which it is intended, and is not limited to any particular value, but if the density of the slurry is too low, the dispersion effect will be inadequate, and if the density of the slurry is too high, the slurry will become viscous and be unable to adequately reduce secondary apatite particles, and reaggregation will be facilitated due to interaction between the particles after dispersion, so that in most cases the concentration should be within the range of 0.01 and 80 percent by weight, and preferably between 10 and 50 percent by weight.

The apatite slurry of the present invention is not limited to any particular use, but possible uses include raw material for polyester fibers, raw material for polyurethane, adhesives, inks, brake fluids, raw material for PET resins, antifreezes, pharmaceuticals, raw material for cosmetics, paste for electrolytic condensers, raw material for alkyd resins, etc. Furthermore, when used as a raw material for polyester, etc., it is ideal in slurry form, but may also be removed from the solvent and used as a powder where necessary.

Next, the method of manufacture for apatite slurry according to the present invention comprises the steps of suspending and dispersing apatite particles in a water-compatible organic solvent and reducing and dispersing this slurry in an agitation mill until the above degree of dispersion is reached.

Examples of agitation mills include screw types, distribution pipe types (disk-types), agitation tank types, annular types, etc., but there is no particular problem with any type. Furthermore, the reduction medium used in the agitation mill should be bead shaped or ball shaped and the particle size thereof should be 5 mm or less in diameter, preferably 1 mm or less in diameter. If the particle size of the reduction medium exceeds 5 mm in diameter, treatment time will be lengthened, which is not desirable for industrial purposes. There is no particular limit on the quality of the reduction medium and reduction media composed of stainless steel, metals such as iron, ceramics of glass, alumina, zirconium, etc., may be used.

The treatment time in the agitation mill is generally 10 to 240 minutes, preferably 10 to 120 minutes.

By dispersing the apatite aggregates in the specified reduction machine using the special organic solvent described above as a dispersion medium, the apatite particles can be reduced and dispersed to within the degree of dispersion described above.

EXAMPLES

The present invention will be described in further detail hereafter using embodiments as examples.

Examples 1 to 7

Apatite powder was obtained by spraying a commercially-available aqueous hydroxyapatite slurry (Trade name: SUPERTITE; manufactured by Nippon Chemical Industries Co., Ltd.) in a 15° C. air current using a nozzle-type spray dryer and collecting the resultant powder by means of a cyclone back filter.

The rate of drying loss (200° C., 3 hours) in the resultant apatite powder was 2.2 percent. The average particle size of the primary apatite particles in the apatite powder was 30 nm along the short-axis and 60 nm along the long-axis. The particle size distribution in the apatite powder (measured by Microtrac (FRA)) was as shown in FIG. 1, the average particle size of the secondary particles being 23.64 um and the maximum particle size being 80 $\mu$m.

The above apatite powder was dispersed using an agitation mill manufactured by AIMEKKUSU KK (SANDGRINDER 4TSG) under the conditions shown in Table 1. Furthermore, a 400 ml vessel was used and the amount of reduction medium was 250 ml. The dispersion conditions and results obtained are also given in Table 1.

Figure 6:
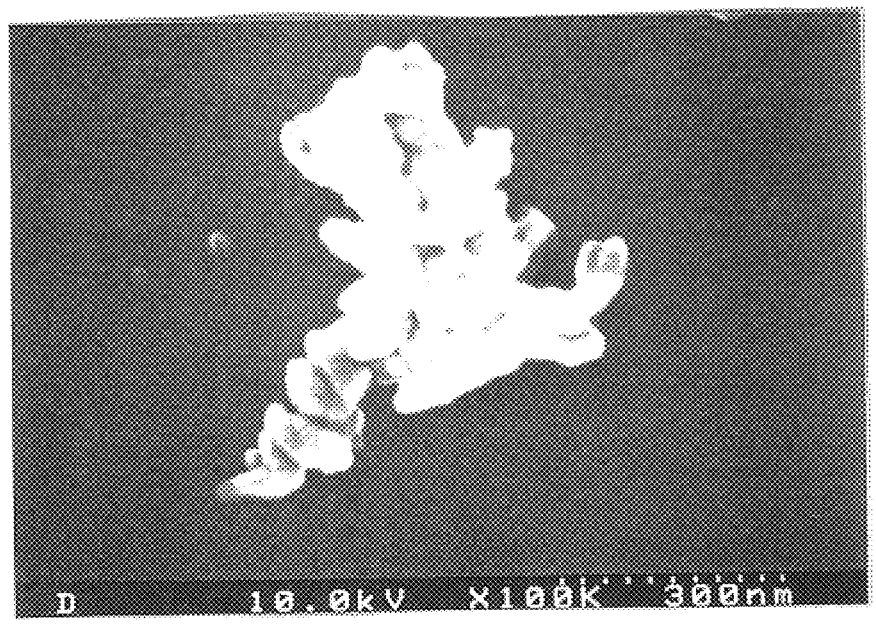
FIG. 6 is a scanning electron micrograph showing the structure of the apatite particles in the apatite slurry obtained in Example 1.
Figure 7:
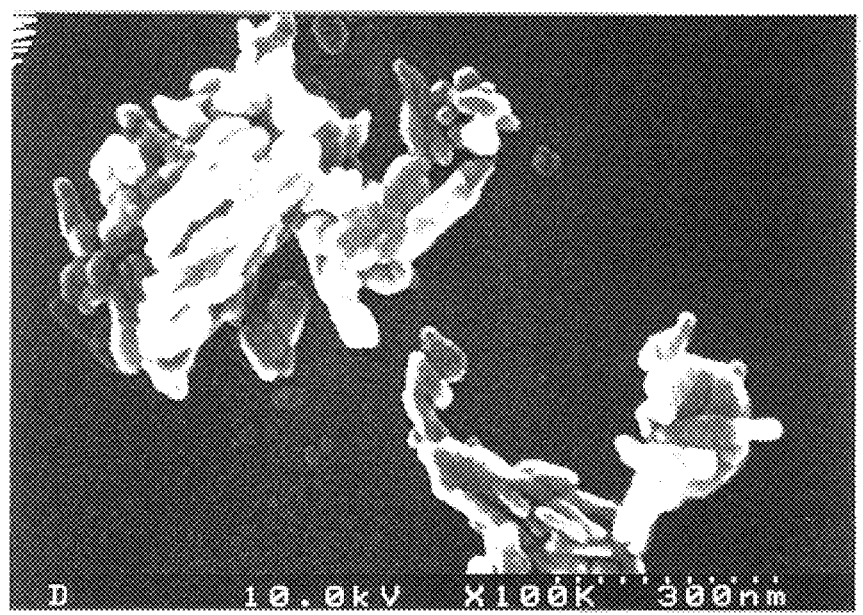
FIG. 7 is a scanning electron micrograph showing the structure of the apatite particles in the apatite slurry obtained in Example 1 from a different angle.

A scanning electron micrograph of the apatite slurry obtained in Example 1 is shown in FIGS. 6 and 7. FIGS. 6 and 7 are taken from different angles.

Figure 2:
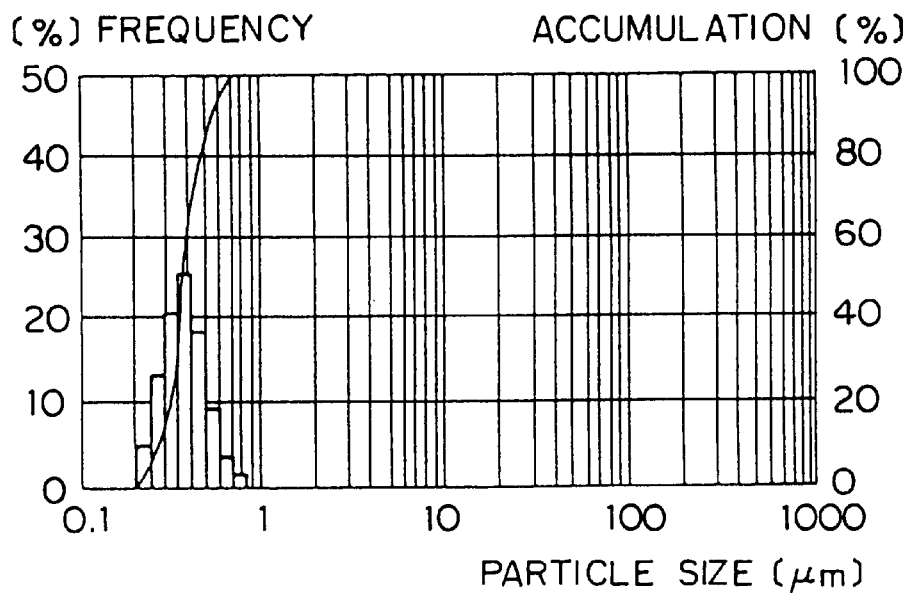
FIG. 2 is a graph of the degree of dispersion in the apatite slurry obtained in Example 2 (product treated for 60 minutes)

The degree of dispersion in the apatite slurry obtained in Example 2 (product treated for 60 minutes) is shown in FIG. 2.

Example 8

Particle growth was encouraged by further heating the apatite powder obtained in the above embodiments to 1100° C. for 3 hours, and an apatite powder was obtained which had a primary particle size of 45 nm along the short-axis and 90 nm along the long-axis. The resultant apatite powder was treated in the same manner as Examples 1 to 7 above under the dispersion treatment conditions described in Table 1 and apatite slurries obtained. The results obtained are also given in Table 1.

Example 9

Apatite slurries were obtained using 1,4-butane diol as the organic solvent with the rest of the process the same as Examples 1 to 7. The dispersion conditions and results obtained are also given in Table 1.

Example 10

Apatite slurries were obtained by the same treatment as Examples 1 to 7 except that an antibacterial apatite was used in which silver and zinc ions had been substituted for some of the calcium ions in the apatite (Trade name: APASAIDAA NB; manufactured by SANGI KK; contains 2% by weight each of silver and zinc). The dispersion conditions and results obtained are also given in Table 1.

Furthermore, the average particle size of the secondary particles in the APASAIDAA NB used was 16.8 $\mu$m and the maximum particle size was 65.0 $\mu$m.

Method of Measuring Degree of Dispersion

Measurement of the degree of dispersion was performed by means of a particle size measuring device which used laser diffraction scattering. A solution containing 17 percent by weight of sodium pyrophosphate was used as a measuring medium with the particles diluted to between 0.01 and 0.02 percent by weight. The samples were not pretreated before being measured. The measuring device used was a Microtrac (FRA) (manufactured by NIKKISO).

Measurement Conditions:

Amount of circulating fluid: 300 ml

Amount of additives in sample (for a sample with ethylene glycol : apatite=70:30): 0.2 ml Particle transparency: transparent Spherical particles: no Refractive index of particles: 1.36

Refractive index of fluid: 1.33

TABLE 1

| | | | | | Hydroxyapatite in slurry | |
| --- | --- | --- | --- | --- | --- | --- |
| | Solvent | Hydroxyapatite:solvent (weight ratio) | Bead diameter (mm$\phi$) | Treatment time (min.) | Average particle size ($\mu$m) | Maximum size ($\mu$m) |
| Example 1 | | | | 10 | 0.54 | 9.25 |
| | | | | 30 | 0.44 | 2.31 |
| | ethylene glycol | 1:9 | 1 | 60 | 0.38 | 0.97 |
| Example 2 | | | | 30 | 0.37 | 3.70 |
| | ethylene glycol | 3:7 | 1 | 60 | 0.37 | 0.97 |
| Example 3 | | | | 10 | 0.64 | 15.56 |
| | ethylene glycol | 4:6 | 1 | 30 | 0.48 | 2.31 |
| | ethylene glycol | 4:6 | 1 | 60 | 0.39 | 1.16 |
| Example 4 | | | | 10 | 0.44 | 44 |
| | ethylene glycol | 3:7 | 0.3 | 30 | 0.43 | 1.64 |
| | ethylene glycol | 3:7 | | 60 | 0.37 | 0.97 |
| Example 5 | | | | 10 | 1.3 | 18.50 |
| | | | | 30 | 0.46 | 9.25 |
| | ethylene glycol | 3:7 | 2 | 60 | 0.43 | 1.95 |
| Example 6 | | | | 10 | 0.61 | 13.2 |
| | mixture of ethylene | 3:7 | 1 | 30 | 0.56 | 2.13 |
| | glycol + water (7:3) | 3:7 | 1 | 60 | 0.37 | 0.98 |
| Example 7 | | | | 10 | 0.57 | 11.00 |
| | aqueous solution of ethylene | 1:9 | 1 | 30 | 0.47 | 1.94 |
| | glycol + 0.02% sodium hexametaphosphate | 1:9 | 1 | 60 | 0.46 | 1.64 |
| Example 8 | | | | 10 | 3.76 | 26.2 |
| | | | | 30 | 0.82 | 6.54 |
| | ethylene glycol | 3:7 | 1 | 60 | 0.50 | 2.31 |

TABLE 1-continued

| | | | | | Hydroxyapatite in slurry | |
|---|---|---|---|---|---|---|
| | Solvent | Hydroxyapatite:solvent (weight ratio) | Bead diameter (mmφ) | Treatment time (min.) | Average particle size (μm) | Maximum size (μm) |
| Example 9 | | | | 10 | 1.49 | 20.3 |
| | | | | 30 | 0.67 | 10.25 |
| | 1,4-butane diol | 1:9 | 1 | 60 | 0.44 | 2.05 |
| Example 10 | | | | 10 | 0.62 | 10.35 |
| | ethylene glycol | 1:9 | 1 | 30 | 0.34 | 1.26 |
| | ethylene glycol | 1:9 | 1 | 60 | 0.28 | 0.77 |

Comparative Examples 1 and 2

Apatite slurries were obtained by the same treatment as Embodiment 1 except that water was used as the organic solvent. The dispersion conditions and results obtained are given in Table 2.

Comparative Example 3

Apatite slurries were obtained by the same treatment as Embodiment 1 except that styrene was used as the organic solvent. The dispersion conditions and results obtained are also given in Table 2.

Comparative Example 4

The results of reducing and dispersing mixtures comprising 9:1 parts by weight of ethylene olycol and hydroxyapatite using a homogenizer (TK HOMO MIXER MARK II (550 W) manufactured by TOKUSHUKIKA KOHGYOH KK) are also shown in Table 2.

Comparative Example 5

Figure 3:
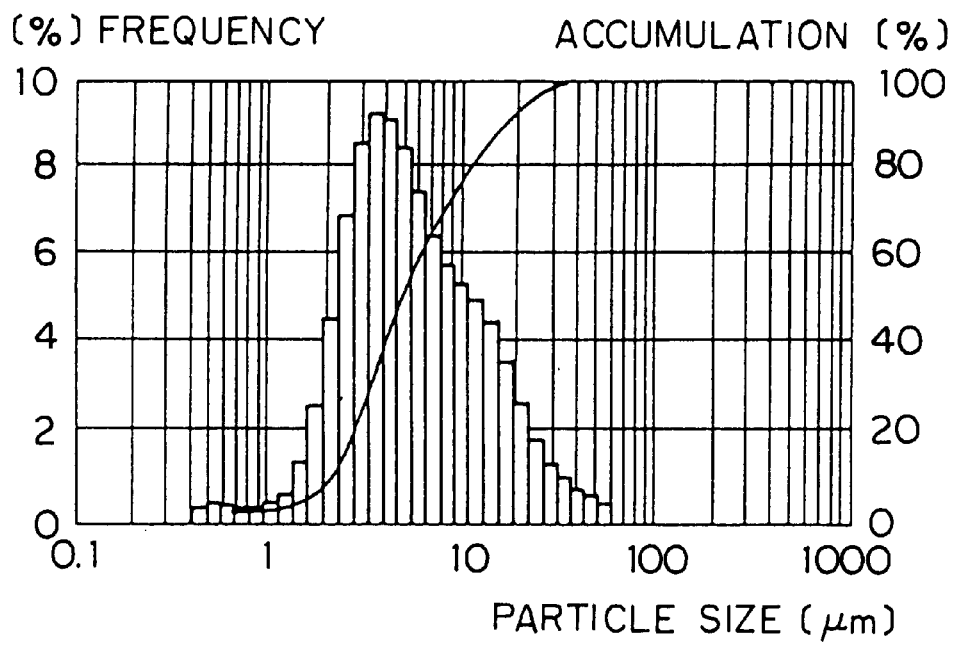
FIG. 3 is a graph of the degree of dispersion in the apatite slurry obtained in Comparative Example 4 (product treated for 60 minutes)

The results of reducing and dispersing mixtures comprising 9:1 parts by weight of water and hydroxyapatite using a homogenizer are shown in Table 2 and FIG. 3.

Comparative Example 6

Figure 4:
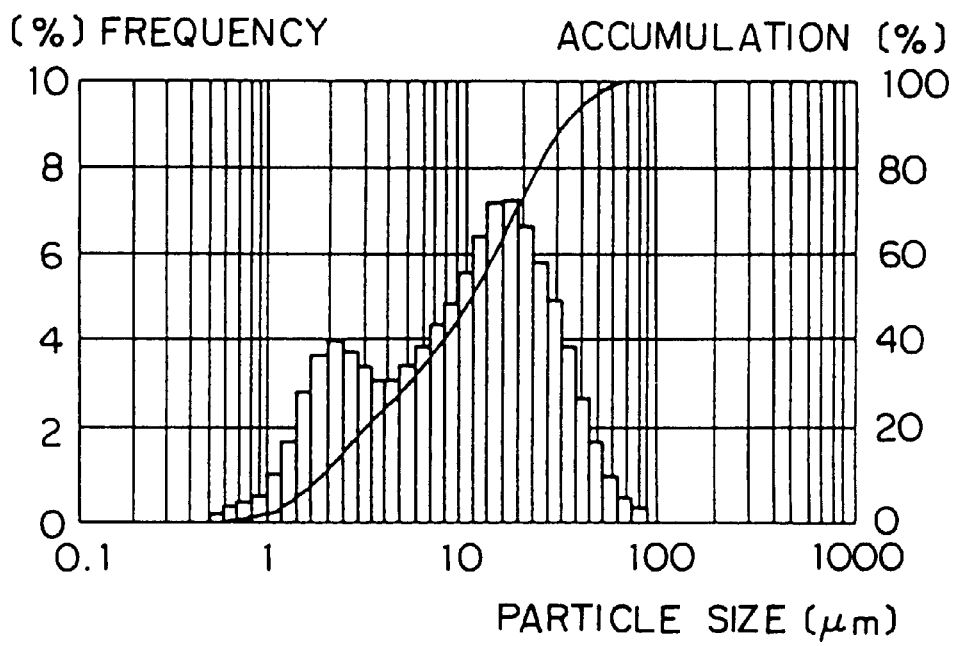
FIG. 4 is a graph of the degree of dispersion in the apatite slurry obtained in Comparative Example 6 (product treated for 30 minutes)

The results of reducing and dispersing mixtures comprising 9:1 parts by weight of ethylene glycol (aqueous solution containing 0.02 % sodium hexametaphosphate) and hydroxyapatite using an ultrasonic disperser (UE-1200Z20S-7A (1.2 kW) manufactured by CHOH'ONPA KOHGYOH KK) are shown in Table 2 and FIG. 4.

Comparative Example 7

The results of reducing and dispersing mixtures comprising 7:3 parts by weight of ethylene glycol and hydroxyapatite using an ultrasonic disperser are shown in Table 2.

Comparative Example 8

Figure 5:
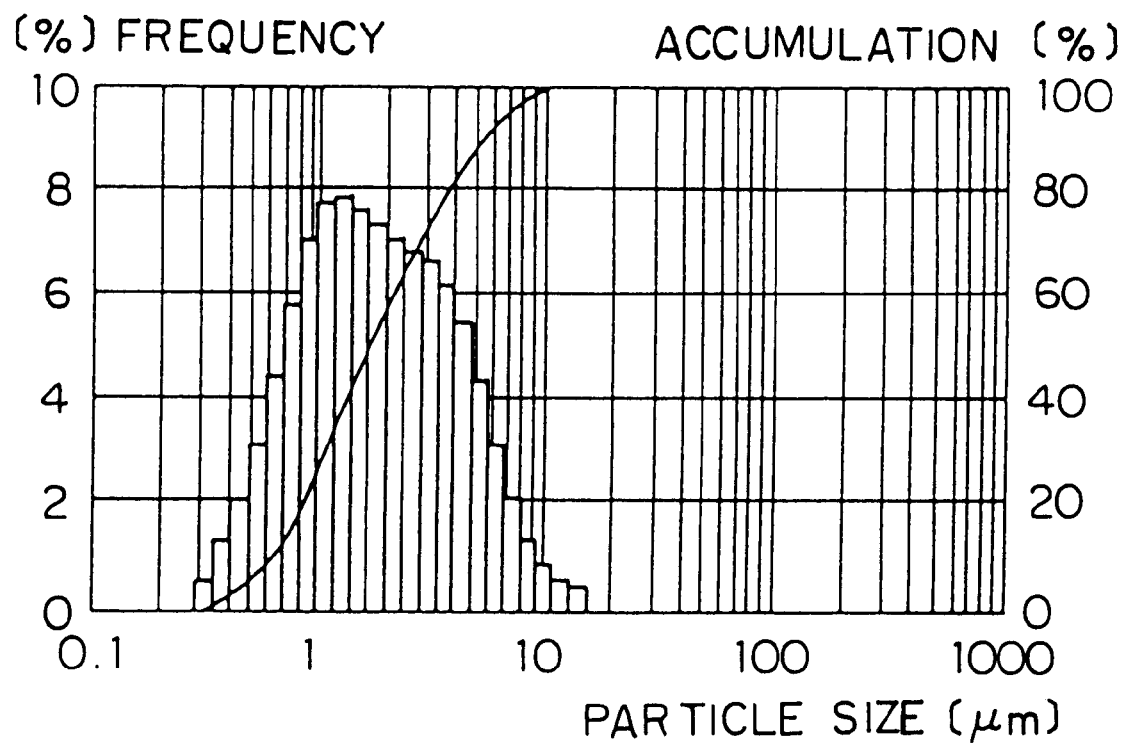
FIG. 5 is a graph of the degree of dispersion in the apatite slurry obtained in Comparative Example 8 (product treated for 30 minutes)

The hydroxyapatite used in Examples 1 to 7 was reduced three times in succession by means of a JET MILL STJ-400 manufactured by SENSHIN Company. The resultant powder had an average particle size of 0.73 microm and a maximum size of 15.6 microm and did not achieve the intended particle size. The particle size distribution of the resultant powder is shown in FIG. 5.

TABLE 2

| | | | | Hydroxyapatite in slurry | |
|---|---|---|---|---|---|
| | Solvent | Hydroxyapatite:solvent (weight ratio) | Treatment time (min.) | Average particle size (μm) | Maximum size (μm) |
| Comparative Example 1 | water | 1:9 | 10 | 0.54 | 9.25 |
| | | | 30 | 0.41 | 9.25 |
| | | | 60 | 0.48 | 13.08 |
| | | | 90 | 0.53 | 18.50 |
| Comparative Example 2 | water | 3:7 | 10 | 0.58 | 11.00 |
| | | | 30 | 0.46 | 31.11 |
| | | | 60 | 0.30 | 31.11 |
| | | | 90 | 0.33 | 44.00 |
| Comparative Example 3 | styrene | 3:7 | 10 | 13.7 | 74.00 |
| | | | 3 | 23.0 | 74.00 |
| | | | 60 | 14.8 | 52.33 |
| | | | 120 | 18.8 | 88.00 |
| Comparative Example 4 | ethylene glycol | 1:9 | 30 | 13.1 | 73.2 |
| | | | 60 | 5.12 | 72.3 |
| Comparative Example 5 | water | 1:9 | 60 | 4.23 | 67.2 |
| | | | 120 | 1.10 | 20.2 |
| | | | 300 | 0.96 | 10.8 |
| Comparative Example 6 | aqueous solution of ethylene glycol + 0.02% sodium hexametaphosphate | 1:9 | 30 | 1.13 | 22 |
| | | | 60 | 1.05 | 18.5 |
| | | | 180 | 0.77 | 9.3 |
| Comparative Example 7 | ethylene glycol | 3:7 | 5 | 18.8 | 89.1 |
| | | | 30 | 10.76 | 87.6 |

TABLE 2-continued

| | | | Hydroxyapatite in slurry | |
|---|---|---|---|---|
| Solvent | Hydroxyapatite:solvent (weight ratio) | Treatment time (min.) | Average particle size ($\mu$m) | Maximum size ($\mu$m) |
| | | 60 | 5.12 | 62.2 |

EFFECT OF THE INVENTION

The present invention provides an apatite slurry in which secondary apatite particles can be practically completely redispersed, and provides a method of manufacture therefor.

What is claimed is:

1. A method for manufacturing an apatite slurry wherein an apatite slurry in which apatite particles are dispersed in a dihydric alcohol is fed to an agitation mill and reduced and dispersed until the degree of dispersion is such that particles of 3 $\mu$m or more are essentially absent.

2. The method for manufacturing an apatite slurry according to claim 1, wherein the concentration of said apatite particles in said apatite slurry is within the range of 0.01 to 80 percent by weight.

3. The method for manufacturing an apatite slurry according to claim 1, wherein said apatite particles are hydroxyapatites and/or hydroxyapatite derivatives.

4. The method for manufacturing an apatite slurry according to claim 3, wherein said hydroxyapatites and/or hydroxyapatite derivatives are obtained by: double decomposition reaction methods in which water-soluble calcium salts and phosphates are reacted in aqueous solution; solid-liquid reaction methods in which slaked lime and phosphoric acid or phosphates are reacted; or synthesis methods in which calcium hydrogenphosphate and slaked lime are hydrolyzed and reacted.

* * * * *